United States Patent [19]

Koechlin

[11] 3,894,507

[45] July 15, 1975

[54] UNWINDING INDICATOR FOR RECORDING CASSETTE USING HYPOCYCLOIDAL GEARS

[76] Inventor: Jean Claude Salomon Koechlin, 2 Place Edmond Rostand, Paris (6 eme.), France

[22] Filed: Apr. 2, 1973

[21] Appl. No.: 347,045

[30] Foreign Application Priority Data

June 7, 1972 France ............................ 72.20485

[52] U.S. Cl. ............ 116/114 R; 74/804; 116/114 J; 242/57; 360/96

[51] Int. Cl. .......................................... G01d 21/00

[58] Field of Search .......... 116/67 A, 124 R, 129 H, 116/114 R, 114 J; 74/804, 805; 360/134, 96, 91; 242/57, 199; 33/127; 352/170

[56] References Cited

UNITED STATES PATENTS

| | | | |
|---|---|---|---|
| 2,151,534 | 3/1939 | Scofield | 116/124 R |
| 2,370,992 | 3/1945 | Perry et al. | 116/124 R |
| 2,781,019 | 2/1957 | Tiger | 116/124 R |
| 3,043,090 | 7/1962 | Sundt | 74/805 X |
| 3,643,895 | 2/1972 | Atsumi | 242/57 |
| 3,734,052 | 12/1974 | Feldman | 116/114 J |

*Primary Examiner*—Richard C. Queisser
*Assistant Examiner*—Daniel M. Yasich
*Attorney, Agent, or Firm*—Strauch, Nolan, Neale, Nies & Kurz

[57] ABSTRACT

A device for indicating the position of strip material such as paper tape, motion picture film, or magnetic tape as it is wound onto or unwound from a reel. Two sets of hypocycloidal gear sets are arranged around the axis of the reel, the inner set being driven by the reel and the outer set being driven by the inner set. The outer gears of each gear set are provided with flanges carrying indicia which provide a precise indication of the extent to which the strip material has been wound onto or unwound from a reel.

3 Claims, 2 Drawing Figures

UNWINDING INDICATOR FOR RECORDING CASSETTE USING HYPOCYCLOIDAL GEARS

BACKGROUND OF INVENTION

The invention relates to unwinding indicators for recording strip cassettes such as paper tape, motion picture film or magnetic tape and, more paricularly, for two-reel cassettes.

In use, these cassettes are frequently removed from the apparatus and changed with another cassette with the intention of returning them to use without rewinding. Under these conditions, location of the recording desired to be processed is not possible in practice. To remedy this, cassettes of this type have been proposed having a transparent window making it possible to see directly the thickness of the winding of the tape on one or other of the reels. However, this locating is very inexact because of the thinness of the tape.

SUMMARY OF INVENTION

The purpose of this invention is to provide a cassette with a locating device incorporated, making it possible to know with precision the state of unwinding of the tape without necessitating any precaution in the placement and removal of the cassette thereby assuring its placement and removal in the precise state of unwinding without the possibility of shifting from the desired starting point.

It is, therefore, a primary object of this invention to provide a cassette having at least one reel fixed to one of the ends of the magnetic tape in the cassette with an eccentric journalling for circular movement of translation, a non-rotating inside ring gear of a first reducing gear set, the teeth of which drivingly cooperate with the teeth of a cooperating outside ring gear formed integrally with a disc member having a peripheral flange concentrically related to the reel and its support shaft and calibrated in angular division marks of minimum value, and a second reducing gear set having an inside ring gear journalled on the outer ring gear of the first reducing gear set for circular movement of translation and having teeth which drivingly cooperate with the teeth of a cooperating outside ring gear peripherally journalled in the peripheral flange and calibrated in angular division marks of higher value, the respective sets of division marks being displayed in adjacent relationship through a window in the cassette housing sidewall to provide indicating indicia to locate precisely in whole and fractional digits the point at which the tape of a removed cassette should be started.

A further object of the present invention is to dispose the two sets of hypocycloidal gears in concentric relation with their respective calibrated marginal faces in a common plane and housed within the spaced delimited between the cassette housing wall and the peripheral flange of the one reel.

BRIEF DESCRIPTION OF THE DRAWINGS

Further objects will appear from the following description and appended claims when read in conjunction with the accompanying illustrative drawings wherein:

DESCRIPTION OF A PREFERRED EMBODIMENT

Figure 1:
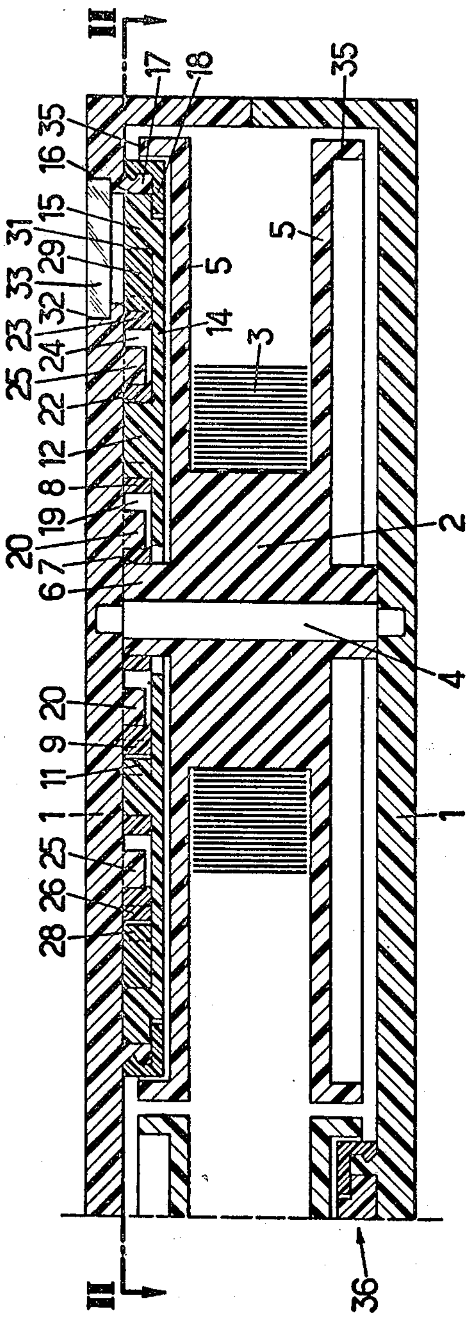
FIG. 1 is an axial section of a cassette fitted with the indicator of the present invention.

Referring to the drawings wherein like reference numerals are used throughout to indicate the same parts, numeral 1 designates the opposite sidewalls of a conventional two reel cassette. One of the reels 2 on which is wound magnetic tape 3 is journalled between walls 1 on a shaft 4 mounted between walls 1. In the embodiment illustrated, reel 2 comprises, in addition, flanges 5 but this is not at all essential for the practice of the invention.

Reel 2 includes a solid hub formed at each end with an eccentric hub portion 6 limited exteriorly by a cylindrical surface 7 eccentric in relation to shaft 4. Around at least one eccentric 6 is mounted a toothed wheel or ring gear 8 the center bore of which surrounds the cylindrical surface 7 with a close clearance fit to permit said hub portion to rotate freely therein, and, on its periphery, are provided a preselected certain number of hypocycloidal teeth 9 whose pitch circle is concentric to cylindrical surface 7. The hypocycloidal teeth of ring gear 8 engage with inside hypocycloidal teeth 11 of a toothed crown or annular gear 12 whose pitch circle 13 is concentric with shaft 4. As can be seen in particular in FIG. 1, this crown gear 12 is made integral with a thin disc-like cover 14 peripherally delimited by a large calibrated, peripheral crown-like flange 15. Flange 15 turns freely in contact with annular surface 16 of circular centering rib 17 concentric with shaft 4 and integrally formed with housing wall 1. The ensemble of parts 8, 12, 14, and 15 is held against axial displacement by a snap ring or hoop 18 fastened to rib 17.

To provide a first hypocycloidal reducing gear set, pitch circles 10 and 13 have very close diameters and, consequently, the number of teeth of gears 8 and 12 are also very close: for example, 15 teeth gear 9 and 16 teeth gear 11 in the example chosen. Further, so that gear 8 will move in a circular movement of translation, consequently resisting its being driven in rotation, circular oversized openings 19, for example four equally spaced oversized openings, are provided in the body of gear 8 to loosely receive cylindrical pins 20 integrally formed with the opposing housing wall 1. The difference in diameter between oversized openings 19 and pins 20 is selected equal to double the offsetting between shaft 4 and surface 7 of eccentric 6. Naturally, the opposite arrangement, with pins integral with the gear 8 and the orifices in the wall, is also possible.

Under these conditions, it can be seen that each time reel 2 makes a full turn in the direction shown by arrow 21, wheel 8 comes back exactly to its initial position and crown or annular gear 12 has turned a sixteenth of a turn in the example selected and in the same direction.

The periphery of crown or annular gear 12 is limited by a cylindrical surface 22 eccentric in relation to shaft 4 (or to peripheral guiding surface 16, which comes to the same thing). This cylindrical surface 22 is received for free rotation within the inner bore of a second gear wheel 23 similar to ring gear 8 and including circular oversized openings 24, similar to oversized openings 19, which engage circular pins 25, similar to pins 20, and integral with wall 1 of the cassette. Gear 23, therefore, also moves with a circular movement of translation corresponding to the eccentric offsetting of circle 22 and is provided on its periphery with hypocycloidal teeth 26 whose pitch circle 27 is concentric with cylindrical surface 22. Teeth 26 mesh with inside teeth 28 of a second crown or annular gear 29 whose pitch circle 30 is concentric with shaft 4. This second annular gear 29 turns freely inside the crown-like flange 15, sliding along cylindrical surface 31 concentric with shaft 4. Here again, the diameters of pitch circles 27 and 30 are very close and the number of gear teeth 26 and 28 are slightly different, for example 99 gear teeth 26 and 100 gear teeth 28 in the example chosen.

Under these conditions, it can be seen that, when crown or annular gear 12 has made a full turn, in the direction of arrow 21, crown or annular gear 29 makes one hundredth of a turn also in the direction of arrow 21. As a result of the two successive stages of reduction, it can be seen that, when reel 2 has made 1600 turns, crown-like flange 15 has made 100 turns and crown or annular gear 29 one turn. By simply calibrating crown-like flange 15 and the planar face of gear 29, it is possible to determine the extent to which the tape has been unwound, provided that the number of windings of the full tape does not exceed this number 1600 in the example chosen, this number corresponding approximately to the actual number of windings of an average size reel. Of course, for larger size reels, it would be possible easily to choose different numbers of teeth for different teethings to provide the desired ratios.

Figure 2:
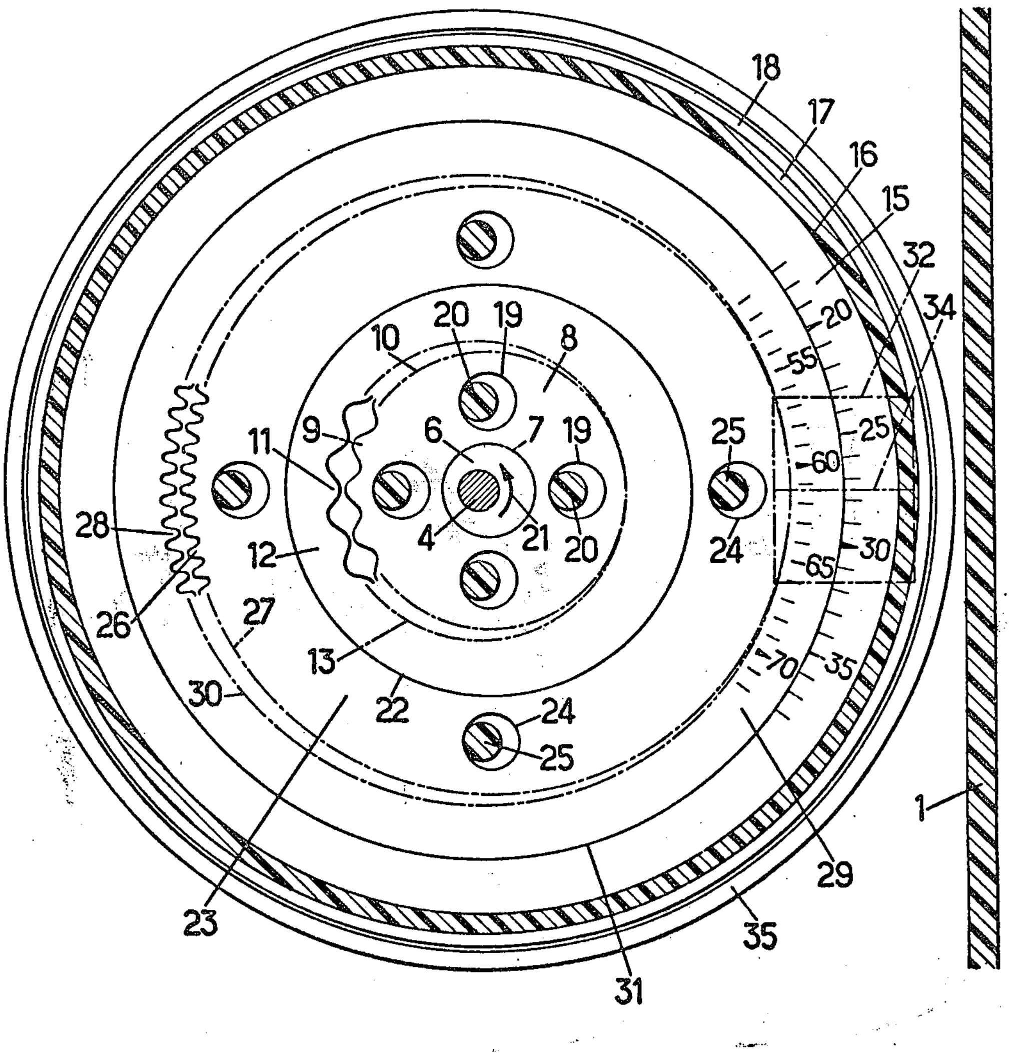
FIG. 2 is a horizontal section along lines II—II of FIG. 1.

The two calibrations carried by parts 15 and 29 can be completely arbitrary and independent but it is advantageous to use for calibration of part 15 two digit decimal numbers from 0 to 99, which makes it possible to read the location in a decimal form, for example, with four digits. Wall 1 of the cassette, against which the device is applied, is provided with a window 32 whose position is represented by broken lines in FIG. 2, this window being advantageously provided with a transparent part 33 on which is inscribed a locating line 34. In this way, reading is in the order of the digits of the greatest weight in the numbering system (61 in FIG. 2), then the digits of less weight (27 in FIG. 2) with the possibility of reading fractions. Therefore, in this case the reading would be 6 127 (or 6 127.5), which, consequently permits a very precise locating point, as can be judged by the number of significant numbers.

It is important to note that this number does not comprise any unit of measurement but is only a simple locating point not representing either minutes or seconds of recording, nor length of tapes, but simply an arbitrary magnitude which is neither proportional to the time nor length of the tape, since the diameter of the windings constantly decreases with the unwinding of the tape. However, it is important to note that, each time the same location point appears in the window, the recorder scans exactly the same point of the tape, since the end of the latter is permanently attached to hub 2 of the reel and the windings of the tape always tighten in the same way on the reel, so that the same length corresponds practically to the same number of turns. Actually, the device does not show the number of turns but an arbitrary number proportional to this number of turns with absolutely any constant of proportionality which does not have to be made precise. In the same way, with the same device, it would be possible to use any other system of calibration, including any letters or signs without necessarily going through a decimal calibration. Also, instead of indicating the amount of tape unwound from the output reel, it would also be possible to indicate the remainder to be unwound from this reel or the amount wound on the receiving reel.

A great advantage of the device according to the invention is its ease in fabrication since pins 20 and 25 are molded directly with the cassette wall 1 at the same time as centering rib 17, and the single piece comprising parts 12, 14, and 15 can advantageously be made in a single piece by molding at the same time as reel 2. Finally, gears 8, 23, and 29 can be molded or simply cut, for example also of plastic. It can be seen that in all these cases very small and very flat pieces, which are easy to manufacture, are involved.

Another advantage of the invention is its very small size, since all the pieces, except cover 14, are practically on the same level, so that all the reducing gears can, as shown in FIG. 1, be housed inside the annular space of one of the flanges 5 of reel 2 without going beyond peripheral reinforcing rib 35 of this flange. This makes it possible practically not to increase the size of the cassette either in horizontal size or thickness.

For cassettes intended to be used on both sides to double the recording capacity, it is, of course, advantageous to place a second device in the opposite flange of the second reel, as shown by fragment 36 in the left part of FIG. 1. In this way, the calibrations carried by the other device appear in another window carried by the other face of the housing. Of course, the recordings and readings corresponding to each face are absolutely independent and there is no and, need not be, any correlation between the calibrations of one face and the other. However, no error is possible since only the top face can ever be read.

Finally, another advantage of the device according to the invention is that it makes it possible to insert and remove the cassette in any unwinding position on either face without any precaution, without any risk of slipping or shifting between the state of unwinding of the tape and the indication carried by the device.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a recording cassette comprising a reel housing having opposed sidewalls supporting the shaft of a reel containing a length of wound tape, an unwinding indicator disposed within said housing, the improvement comprising an eccentric hub portion rotatable with said reel, a first hypocycloidal reducing gear set disposed in surrounding relation to said eccentric hub portion to be driven thereby to effect a fractional incremental rotation of the driven gear of said first gear set for each full rotation of said reel, the driven gear of said first gear set having a surface eccentric with respect to said shaft, a second hypocycloidal reducing gear set operatively cooperating with said first gear set and driven by said eccentric surface to effect a fractional rotation of the driven gear of said second gear set for each full rotation of said driven gear of said first gear set, the driven gears of said first and second gear sets having adjacent coplanar annular surfaces, and indicia on said annular surfaces observable from the exterior of the housing relative to a reference mark on said housing to indicate the extent to which said tape has been unwound from said reel.

2. An unwinding indicator for reel recording cassettes having opposed housing sidewalls mounting a support shaft for a reel carrying a length of tape, said unwinding indicator comprising an eccentric hub portion integral with said reel, first and second serially arranged reducing hypocycloidal gear sets disposed in surrounding relation to said eccentric hub portion, said first gear set being driven by said hub portion to effect a fractional incremental rotation of the driven gear of the first reducing gear set for each full rotation of said reel and said second gear set being driven by an eccentric surface on said first gear set to effect a fractional rotation of the driven gear of said second reducing gear set for each full rotation of the driven gear of said first gear set, said driven gear of said first gear set being rotatably carried by said housing and having a flange rotatably receiving the driven gear of said second set, and indicia carried by the driven gear of each set and observable from the exterior of said housing relative to a reference mark on said housing for indicating the extent to which said tape has been unwound from said reel.

3. An unwinding indicator for two-reel recording cassettes characterized by the fact that at least one of the reels is formed with a surface eccentric with respect to the axis of said reel, driving, in a circular movement of translation, a first external tooth gear constrained against rotation by means of pin means provided in the wall of said cassette and extending into oversized pin receiving openings in said first gear, a first internal tooth gear driven by said first external tooth gear, the inside teeth of which are but slightly greater in number than the teeth of said first gear, said internal tooth gear having a large peripheral flange and an eccentric surface, driving, in circular movement of translation, a second external tooth gear constrained against rotation by pin means extending from a wall of said cassette into oversized pin receiving openings in said second external tooth gear, a second internal tooth gear driven by said second external tooth gear, the inside teeth of which are but slightly greater in number than the teeth of said second external tooth gear, said second internal tooth gear being provided with a flange fitting within the flange of said first internal tooth gear, and cooperating calibrations on said flanges disposed in co-planar relation for exposure through wndow means in the cassette for external observation relative to a reference mark on said housing.

* * * * *